(12) United States Patent
Spratt

(10) Patent No.: US 6,983,146 B2
(45) Date of Patent: Jan. 3, 2006

(54) LOCATION DETERMINATION USING LOCATION DATA ITEMS RECEIVED BY SHORT-RANGE COMMUNICATION

(75) Inventor: Michael P Spratt, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 526 days.

(21) Appl. No.: 10/162,036

(22) Filed: Jun. 3, 2002

(65) Prior Publication Data

US 2002/0187782 A1 Dec. 12, 2002

(30) Foreign Application Priority Data

Jun. 11, 2001 (GB) .................................. 0114144
Jul. 20, 2001 (GB) .................................. 0117698

(51) Int. Cl.
*H04Q 7/20* (2006.01)
*H04B 5/00* (2006.01)

(52) U.S. Cl. .................. 455/435; 455/456.1; 455/41.2

(58) Field of Classification Search ............. 455/435.1, 455/435.2, 435.3
See application file for complete search history.

(56) References Cited

U.S. PATENT DOCUMENTS

| 3,715,758 | A |   | 2/1973  | Sender ................... 343/112 R |
| 4,636,795 | A |   | 1/1987  | Dano ......................... 342/387 |
| 4,703,444 | A |   | 10/1987 | Storms et al. .............. 364/561 |
| 5,365,451 | A | * | 11/1994 | Wang et al. ................. 701/213 |
| 5,428,544 | A |   | 6/1995  | Shyu .......................... 364/436 |
| 5,663,990 | A |   | 9/1997  | Bolgiano et al. ........... 375/347 |
| 5,917,449 | A |   | 6/1999  | Sanderford et al. ........ 342/457 |
| 5,982,324 | A |   | 11/1999 | Watters et al. ......... 342/357.06 |
| 6,054,950 | A |   | 4/2000  | Fontana ..................... 342/483 |
| 6,084,547 | A |   | 7/2000  | Sanderford et al. ......... 342/457 |
| 6,097,336 | A |   | 8/2000  | Stilp ..................... 342/357.02 |
| 6,201,803 | B1| * | 3/2001  | Munday et al. ............. 370/350 |
| 6,216,002 | B1| * | 4/2001  | Holmring ................... 455/436 |
| 6,324,406 | B1| * | 11/2001 | Zadeh ..................... 455/456.2 |
| 6,477,353 | B1| * | 11/2002 | Honda et al. ............... 455/11.1 |
| 6,714,161 | B2| * | 3/2004  | Spratt ......................... 342/464 |
| 6,816,460 | B1| * | 11/2004 | Ahmed et al. .............. 370/238 |

FOREIGN PATENT DOCUMENTS

| DE | 36 33 557 A1  | 4/1987  |
| DE | 199 03 909 A1 | 3/2000  |
| DE | 199 03 909 A1 | 8/2000  |
| EP | 0 341 738 A2  | 11/1989 |
| EP | 0 948 222     | 10/1999 |
| EP | 1 030 531 A1  | 8/2000  |

(Continued)

OTHER PUBLICATIONS

Savarese, C., et al., "Locationing in Distributed Ad-Hoc Wireless Sensor Networks," *2001 IEEE International Conference on Acoustics, Speech, and Signal Processing*, vol. 4 of 6, pp 2037-2040 (May 7, 2001).

(Continued)

*Primary Examiner*—Sonny Trinh
*Assistant Examiner*—M. Santiago-Cordero

(57) ABSTRACT

A location determination method uses location data items that originate at known locations and are passed to, and diffused between, entities by short-range communication. Each location data item received by an entity specifies its originating location and a time value dependent on when it originated from that location. An entity derives its location from received location data items by effecting a weighted combination of the known locations specified in the received location data items, the weighting of the known location specified in each received location data item being dependent on the associated time value.

24 Claims, 2 Drawing Sheets

FOREIGN PATENT DOCUMENTS

| | | |
|---|---|---|
| EP | 1 133 115 | 9/2001 |
| EP | 1 174 728 | 1/2002 |
| GB | 2338374 | 12/1999 |
| GB | 2354386 | 3/2001 |
| JP | 2001-116820 | 4/2001 |
| WO | 99/65152 | 12/1999 |
| WO | 01/10154 | 2/2001 |
| WO | 01/10154 A1 | 2/2001 |
| WO | 01/27649 A1 | 4/2001 |

OTHER PUBLICATIONS

Abstract of JP 2001-116820, published Sep. 1999, Derwent, 1 page.

* cited by examiner

LOCATION DETERMINATION USING LOCATION DATA ITEMS RECEIVED BY SHORT-RANGE COMMUNICATION

FIELD OF THE INVENTION

The present invention relates to location determination and, in particular, to location determination by an entity in an environment in which multiple items of location data are diffused to and between entities by short-range communication.

BACKGROUND OF THE INVENTION

A number of technologies exist for the short range communication of information between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

One possible use for such short-range technologies is the transmission of local information to passers-by equipped with mobile devices having short-range transceivers, the local information being, for example, transmitted by a shop to inform the passers-by of current promotions. Another use is in location beacons that transmit location information to passers-by.

It is known, for example from EP-A-0,948,222, to diffuse information amongst users by short range wireless links so that a user need not be in range of an originating transmitter in order to receive the information sent out by the latter. Such an arrangement is likely to be particularly useful in environments such as shopping malls, city centers, tourist attractions, theme parks or any other location where large numbers of users carrying mobile devices with short-range transceivers are likely to be in one locality. Another important area of application is the diffusion of information between devices fixed in cars.

FIG. 1 of the accompanying drawings depicts an information diffusion process in which an originating information point 10 (typically fixed, but not necessarily so) sends out the information over a short-range radio link to nearby mobile devices, in this case device 11. The receiving device 11 transmits on the information to a neighboring device 12 and then moves (see dashed arrow in FIG. 1) before sending on the information again to another device 14. Meanwhile mobile device 12 has moved into proximity with device 13 to which it also transmit the information. Device 13 now moves near to the device 14 and passes the latter the information—however, as device 14 already has the information from device 11, it ignores the copy from device 13. Device 13 also passes the information to a fixed relay transceiver which subsequently passes the information to a mobile device 15. Finally, device 15 passes the information to device 14 which has now within range of device 15; again, device 14 ignores the copy information from device 15.

It can be seen that information can be rapidly diffused among the population of mobile-device users in the general vicinity of the source 10. So, the process of diffusion takes advantage of both the short range wireless technology and the movement of the users carrying the devices.

By applying appropriate diffusion-limiting mechanisms (for example, by assigning the original information a total time to live of, for example, 10 minutes), the information can be restricted to the vicinity of the originating point 10. This makes the diffusion process appropriate for the diffusion of location relevant information that is primarily of use only in the vicinity of point 10.

The diffused information can, of course, include the location of the originating point. For devices receiving the information directly from the originating point, this provides them with a fairly accurate indication of their location (because the information is received over a short-range link). However, as the information is diffused between devices, the newly-receiving devices get less and less accurate location information.

Our European Application EP-A-1 174 728 describes a method by which an entity can discover its location using multiple items of location data received by short-range diffusion from several sources. In this method, each location data item includes an indication of the distance traveled by the location data item from its source, either by displacement of entities temporarily holding the item or by transmission. This distance represents an upper bound on the current distance of a receiving entity from the source concerned and this can be used, together with upper-bound distances from other sources, to discover a current zone where the entity is likely to be located; various averaging techniques can then be applied to derive a current location for the entity. This location determination method can involve significant processing of the received location data which may not always be desirable.

It is an object of the present invention to provide a location discovery method and apparatus that uses a straightforward method of location estimation by combining items of location data received by short-range communication.

SUMMARY OF THE INVENTION

According to one aspect of the present invention, there is provided a location determination method wherein an entity receives, by short-range communication, location data items originating at known locations and each specifying its originating location and a time value dependent on when it originated from that location; the entity deriving its location from location data items it has received by effecting a weighted combination of the known locations specified in the received location data items, the weighting of the known location specified in each received location data item being dependent on the associated time value.

According to another aspect of the present invention, there is provided an entity provided with a location discovery system comprising:
   a short-range receiver for receiving location data items from currently nearby transmitting entities, each location data item indicating its originating location and a time value dependent on when it originated from that location;
   a memory for storing the received location data items; and
   a location derivation arrangement operative to determine the location of the entity by effecting a weighted combination of the known locations specified in the received location data items, the weighting of the known location specified in each received location data item being dependent on the associated time value.

According to a further aspect of the present invention, there is provided a location determination method wherein location data items originating at known locations are passed to, and diffused between, entities by short-range communication, each location data item received by an entity including an age value dependent on when the item originated from a specified said known location; a said entity deriving its location from location data items it has received by combining the known locations specified in the location data items in dependence on the related age values of the location data items.

BRIEF DESCRIPTION OF THE DRAWINGS

Location discovery methods and entities implementing these methods, all embodying the invention, will now be described, by way of non-limiting example, with reference to the accompanying diagrammatic drawings, in which.

BEST MODE OF CARRYING OUT THE INVENTION

Figure 1:
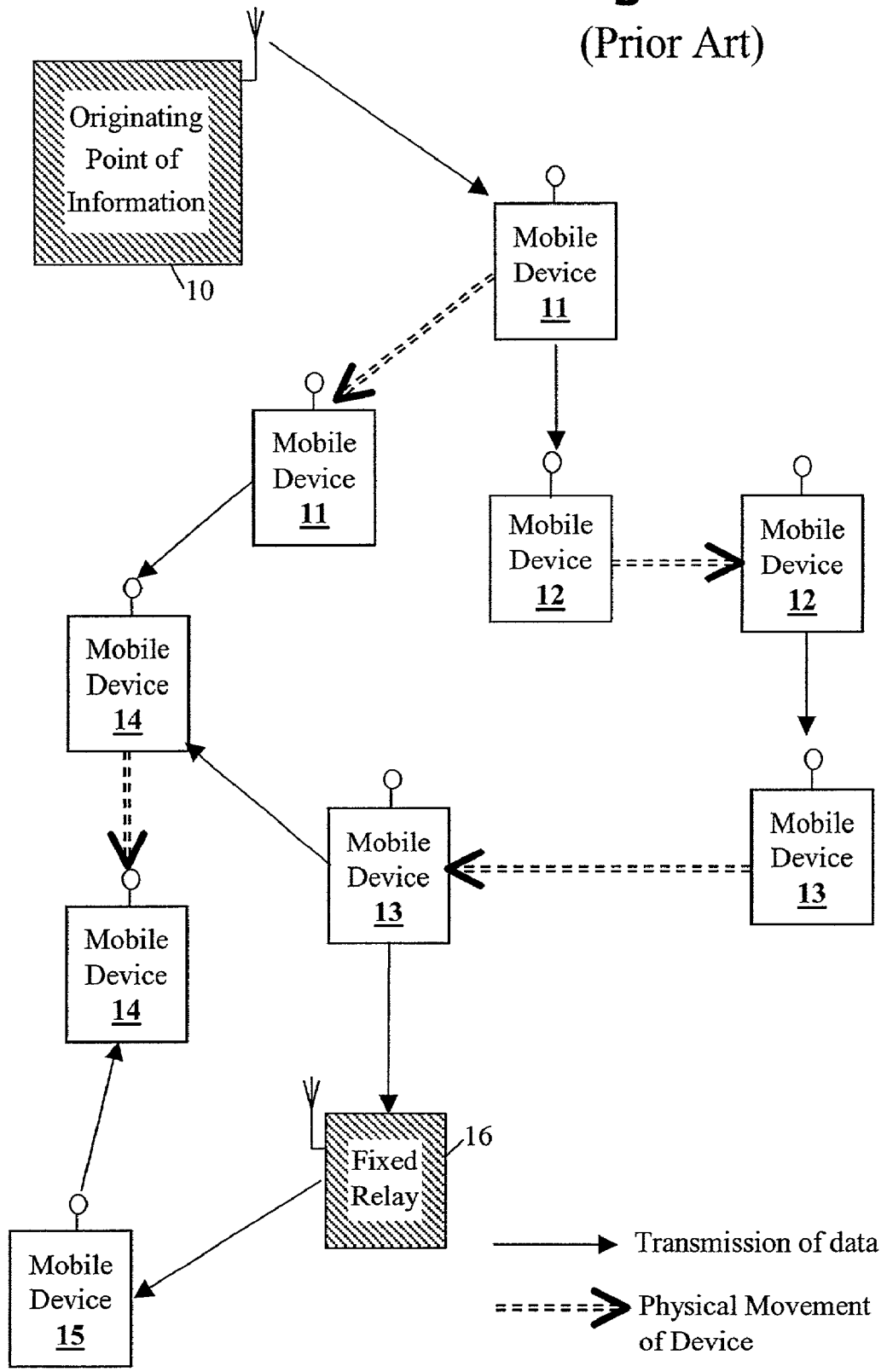
FIG. 1 is a diagram illustrating a known information diffusion technique.
Figure 2:
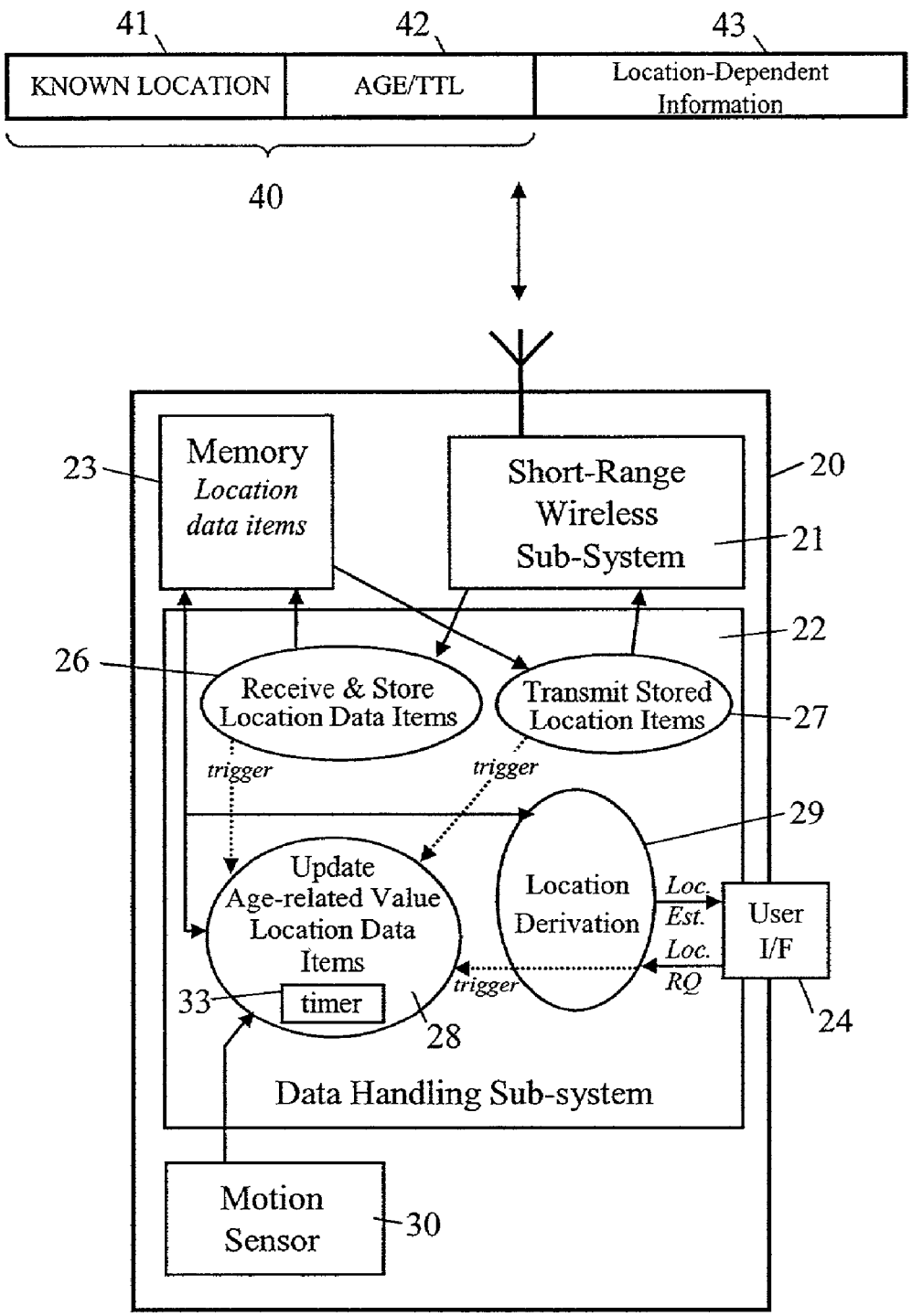
FIG. 2 is a diagram of an entity embodying the present invention arranged to derive an estimate of its location from location data received by short-range communication.

FIG. 2 shows an entity 20 embodying the present invention, the main functional elements of the entity 20 comprising:
- a short-range wireless transceiver subsystem 21 (for example, infrared-based or, preferably, radio-based such as a Bluetooth system) for receiving and (preferably) transmitting location data items 40 from/to nearby entities of similar form;
- a data-handling subsystem 22 for handling and maintaining the location data items 40 and effecting location determinations;
- a memory 23 for storing location data items 40 received via the wireless subsystem 21 and the data-handling subsystem 22;
- a user interface 24 for displaying location information to the user; and
- a motion detector 30 for detecting when the entity 20 is moving.

The data-handling subsystem runs four main processes, these being a process 26 for receiving and storing location data items 40; a process 27 for controlling the onward transmission of location data items whenever the wireless subsystem 21 determines that there is another entity close by; a process 28 for updating an age-related value of each location data item; and a process 29 for effecting a current location estimation based on the received location data items and for outputting the results of the determination to user interface 24.

Each location data item 40 comprises two fields 41 and 42. Field 41 holds an identifier specifying a known location, either as a label which can be used to look up the location (for example, using data held in memory 23), or directly as location coordinates for the location. Field 42 holds an age-related value for the location data item as will be explained below. Each location data item originates from a short-range transmission source located at the known location specified in the data item and may reach the entity 20 either directly or by diffusion across one or more intermediate mobile and/or static entities.

Each location data item 40 may be transmitted as the sole content of a message or may be included with other message content such as location-dependent information 43.

The operation of the entity will be further described below initially for the case of the age-related field 42 of each location data item holding an age value for the item as measured from the first transmission of the item from its origin; in addition, the role of the motion sensor 30 will initially be left aside.

When a location data item is received by the entity 20 it is stored to memory 23 by process 26. Reception of this item results in process 26 sending a trigger to the process 28 causing the latter to re-initialize a timer 33. When a next location data item is received, the process 28 is again triggered to re-initialize the timer. However, each time before process 28 re-initializes its timer 33, it adds the current timer value to the age value of each location data item already stored in the memory 23 (that is, not including the item just received).

The process 28 is also triggered by process 27 before the latter transmits on the stored location data items, this triggering again resulting in the timer value being added to the age values of the stored location data items and the timer being re-initialized.

The process 28 is further triggered by a user request RQ made via the interface 24, for a estimate of the current location of the entity 20; this triggering yet again resulting in the timer value being added to the age values of the stored location data items and the timer being re-initialized.

As a result of the above-described operation of the process 28, when the process 29 comes to use the stored location data items to effect a current location estimation, or when the items are retrieved for transmission by process 27, the age-related value of each stored location data item will have been increased by its respective storage time in the entity 20 over what the value was when the item was first received. Assuming that all entities that take part in diffusing the location data items perform a similar update of the age-related field 42 of each item, this field will hold a value indicative of the age of the item, at least when about to be transmitted on or used in a location estimation.

Turning now to a consideration of the process 29 for deriving an estimate of the current location of the entity 20, in general terms entity 20 will have received one or more location data items LD1 to LDn each comprising the coordinates (typically x, y coordinates) of a specific known location, and an age value 'a' that is a measure of the age of the location data since leaving its source In other words, the entity 20 possesses location information that can be represented as:

($a_1$, $x_1$, $y_1$); ($a_2$, $x_2$, $y_2$); ($a_3$, $x_3$, $y_3$); etc.

The present estimation process is based on the assumption that the greater the age of a location data item, the less importance should be attached to it in the location derivation process; this is a reasonable assumption to make since the greater the age of an item, the more time it has had to be diffused away from its source. The simplest way of applying this assumption is to make the importance of the known location identified by a location data item proportional to the inverse of the age value (1/a) of that item. A weighted average can be calculated by process 29 as follows:

X coordinate of estimate of position=K.($x_1/a_1+x_2/a_2+x_3/a_3$ ...) where K is defined as $1/(1/a_1+1/a_2+1/a_3$ ...)

Y coordinate of estimate of position=K.($y_1/a_1+y_2/a_2+y_3/a_3$ ...) where K is again $1/(1/a_1+1/a_2+1/a_3$ ...)

An alternative form of expressing this is:

X coordinate of estimate of position=K.($x_1.c_1+x_2.c_2+x_3.c_3$ ...)

Y coordinate of estimate of position=K.($y_1.c_1+y_2.c_2+y_3.c_3$ ...) where $c_i$ is equal to $1/a_i$ and K is $1(c_1+c_2+c_3$ ...)

In the case where c1, c2, c3 etc. are all the same, the above expression just leads to a straightforward average of x1, x2, x3 ... and y1, y2, y3 ...

Note that in order to avoid ai being zero, the field 42 can initially be set to a predetermined minimum value or an equivalent precaution taken by the process 29.

As an alternative to weighting each coordinate value by K/a, a weighting factor of $K/a^2$ can be used.

In general, there exists a class of location estimates, where the estimate is of the form:

X coordinate of location estimate=F(a1, a2, a3, ... x1, x2, x3, ... )

Y coordinate of location estimate=G(a1, a2, a3, ... y1, y2, y3, ... ) where F( ) and G( ) are predetermined functions.

Even more generally:

X coordinate of location estimate=H(a1, a2, a3, ... x1, x2, x3, ... y1, y2, y3

Y coordinate of location estimate=L(a1, a2, a3, ... x1, x2, x3, ... y1, y2, y3 where H( ) and L( ) are predetermined functions.

Of course, time spent by location data items in a stationary entity 20 does not in reality decrease their relevance to the estimation process. Accordingly, entity 20 can be provided with the motion sensor 30 to detect periods when the entity is being moved. The output of the sensor 30 is supplied to the update process 28 and the latter is arranged to temporarily halt its timer 30 whenever the entity is not sensed as moving. In this way, the age of each item becomes its age when moving which is likely to provide a more reliable weighting of the items in the location estimation process.

In cases where the motion sensor 30 is not employed, an alternative way of measuring the age of each location data item would be for the age-related field to hold a timestamp of when the item was first transmitted. Assuming that the entity 20 has a clock that is substantially coordinated with the timestamp clocks of the items sources, it then becomes possible for the process 29 to calculate the age of each item as an initial part of location estimation; the process 28 would then no longer be needed.

Another alternative would be for the age-related field 42 of each location data item to hold a time-to-live value that is initialized by the item source, this value being decreased by the holding time in each entity (by a process very similar to process 28 and similarly triggered) until the time to live expires at which time the item is discarded. In this case, the location estimation process 29 can, for example, be arranged to weight the location contained in each location data item in proportion to the associated time-to-live value. The update process timer value used for updating the time-to-live value of an item can be restricted to only include times when the entity is in motion, this being done in the same way as described above for when the field 42 held an age value.

Many variations are, of course, possible to the above-described embodiments of the invention. For example, whilst the data handling subsystem 22 is typically implemented as a program controlled processor for executing various processes, some or all of the functionality of the data handling subsystem could alternatively be effected by dedicated circuitry and, conversely, some of the functionality represented by the other elements of the entity 20 can be implemented by processes executed by the data handling subsystem 22.

It will be appreciated that any suitable coordinate system can be employed for specifying locations; for example a latitude/longitude based coordinate system can be used or a locally defined coordinate system (the latter potentially being more appropriate for use in an environment such as a shopping mall or theme park). Thus the weighted combination of the source locations used in deriving entity location can be effected by weighting the appropriate components according to the coordinate system being used.

The entity 20 can be mobile or static in form (in the latter case, a motion sensor 30 would not be provided and the update process could be omitted as the relevance of the items does not change with how long they have been held by the entity provided the latter is not moved). In the case of a mobile entity, if vehicle borne, the components of the entity could be integrated into the vehicle systems whereas a person-carried entity is more conveniently integrated into a single package or incorporated into another item of portable equipment such as a mobile phone.

What is claimed is:

1. A location determination method comprising:
   an entity receiving by short-range communication, location data items that originate at known locations and that each specifies its originating location and a time value dependent on when it originated from that location; and
   the entity deriving it's location from location data items it has received by effecting a weighted combination of the known locations specified in a plurality of the received location data items, the weighting of the known location specified in each received location data item used in effecting the weighted combination being greater than zero and dependent on the associated time value.

2. A method according to claim 1, wherein the time value specified by a location data item comprises an age value.

3. A method according to claim 2, wherein the weighting of the known location specified in each received location data item is inversely related to the associated age value.

4. A method according to claim 2, wherein the entity, prior to using a location data item in the derivation of its location, updates the age value of that item by increasing it by an amount corresponding to the time the item has been held by the entity.

5. A method according to claim 4, wherein the updating is effected progressively by updating the held location data items at least each time a new item is received or a location derivation is to be effected, each updating being by a time amount for the period since the last updating.

6. A method according to claim 2, wherein the entity senses when it is in motion, the entity, prior to using a location data item in the derivation of its location, updating the age value of that item by increasing it by an amount corresponding to the time the item has been held by the entity whilst in motion.

7. A method according to claim 6, wherein the updating is effected progressively by updating the held location data items at least each time a new item is received or a location derivation is to be effected, each updating being by a time amount for the period since the last updating.

8. A method according to claim 1, wherein the time value specified by a location data item comprises a timestamp for when the item originated from its originating location, this timestamp being used by the entity, when deriving its location, to determine the age of the corresponding location data item, this age then being used to weight the known location specified in the location data item.

9. A method according to claim 8, wherein the weighting of the known location specified in each received location data item is inversely related to the age determined for the item.

10. A method according to claim 1, wherein the time value specified by a location data item comprises a time-to-live value.

11. A method according to claim 10, wherein the weighting of the known location specified in each received location data item is proportional to the associated time-to-live value.

12. A method according to claim 10, wherein the entity, prior to using a location data item in the derivation of its location, updates the time-to-live value of that item by decreasing it by an amount corresponding to the time the item has been held by the entity.

13. A method according to claim 12, wherein the updating is effected progressively by updating the held location data items at least each time a new item is received or a location derivation is to be effected, each updating being by a time amount for the period since the last updating.

14. A method according to claim 10, wherein the entity senses when it is in motion, the entity, prior to using a location data item in the derivation of its location, updating a time-to-live value of that item by decreasing it by an amount corresponding to the time the item has been held by the entity whilst in motion.

15. A method according to claim 14, wherein the updating is effected progressively by updating the held location data items at least each time a new item is received or a location derivation is to be effected, each updating being by a time amount for the period since the last updating.

16. A device, comprising:
   a short-range receiver for receiving location data items from currently nearby transmitting entities, each location data item indicating its originating location and a time value dependent on when it originated from that location;
   a memory for storing the received location data items; and
   a location derivation arrangement operative to determine the location of the device by effecting a weighted combination of the known locations specified in a plurality of the received location data items, the weighting of the known location specified in each received location data item used in effecting the weighted combination being greater than zero and dependent on the associated time value.

17. A device according to claim 16, wherein the time value specified by a location data item comprises an age value.

18. A device according to claim 17, further comprising an update arrangement for updating the received data items by increasing the age value associated with each data item by an amount related to the time the item has been held by the device.

19. A device according to claim 17, further comprising a motion sensor, and an update arrangement for updating the received data items by increasing the age value associated with each data item by an amount corresponding to the time the item has been held by the device whilst in motion as sensed by the motion sensor.

20. A device according to claim 16, wherein the time value specified by a location data item comprises a timestamp for when the item originated from its originating location, the location derivation arrangement using this timestamp to determine the age of the corresponding location data item, which it then uses to weight the known location specified in the location data item.

21. A device according to claim 16, wherein the time value specified by a location data item comprises a time-to-live value.

22. A device according to claim 21, further comprising an update arrangement for updating the received data items by decreasing the time-to-live value associated with each data item by an amount related to the time the item has been held by the device.

23. A device according to claim 21, further comprising a motion sensor, and an update arrangement for updating the received data items by decreasing the time-to-live value associated with each data item by an amount corresponding to the time the item has been held by the device whilst in motion as sensed by the motion sensor.

24. A location determination method comprising:
   passing location data items that originate at known locations to, and diffusing between, entities by short-range communication, each location data item received by an entity including an age value dependent on when the item originated from a specified said known location; and
   a said entity deriving its location from a plurality of location data items it has received by assigning a weight greater than zero to the known locations specified in each of the plurality of received location data items in dependence on the related ages of the respective location data items and combining the weighted known locations.

* * * * *